US006683884B1

(12) United States Patent
Howard (10) Patent No.: US 6,683,884 B1
(45) Date of Patent: Jan. 27, 2004

(54) SHARED CREDIT ROUND ROBIN QUEUING

(75) Inventor: Stephen C. Howard, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/541,048

(22) Filed: Mar. 31, 2000

(51) Int. Cl.[7] .............................................. H04L 12/28
(52) U.S. Cl. ...................................... 370/412; 370/417
(58) Field of Search ............................... 370/230, 230.1, 370/232, 235, 235.1, 412, 417

(56) References Cited

U.S. PATENT DOCUMENTS

| | | | | |
|---|---|---|---|---|
| 5,905,730 A | * | 5/1999 | Yang et al. | 370/429 |
| 5,995,511 A | * | 11/1999 | Zhou et al. | 370/412 |
| 6,041,040 A | * | 3/2000 | Beshai et al. | 370/232 |
| 6,247,061 B1 | * | 6/2001 | Douceur et al. | 709/240 |
| 6,359,861 B1 | * | 3/2002 | Sui et al. | 370/230 |

OTHER PUBLICATIONS

"Efficient Fair Queuing using Deficit Round Robin," Shreedhar et al., Oct. 16, 1995, Washington University, St. Louis, MO, pp. 1–22.

"Link–sharing and Resource Management Models for Packet Networks," Floyd et al., IEEE/ACM Transactions on Networking, vol. 3, No. 4, Aug. 1995, pp. 1–22.

* cited by examiner

*Primary Examiner*—Alpus H. Hsu
*Assistant Examiner*—Michael J Molinari
(74) *Attorney, Agent, or Firm*—Pillsbury Winthrop LLP (57) ABSTRACT

The present invention discloses a queue servicing method and system for servicing queues containing packetized data in a network switching device. The invention includes initializing parameters for multiple queues, such as a quantum value, a borrow enable flag, and a first counter maximum value. The invention increments a first counter for each of the queues with the quantum value and donates the quantum value to a share counter, when the value of the first counter exceeds the first counter maximum value. The invention then selects a packet from each of the queues to be dequeued and transmitted on an output channel of the network device. The packet is dequeued and transmitted when a byte length of the packet is less than or equal to the value contained in the first counter or when the borrow enable flag of the queue is enabled and the byte length of the packet is less than or equal to a sum of the values contained in the first counter and the share counter.

28 Claims, 11 Drawing Sheets

SHARED CREDIT ROUND ROBIN QUEUING

BACKGROUND OF THE INVENTION

1. Field of the Invention

This invention generally relates to the field of data communication networks. More particularly, the present invention relates to a novel system and method for ensuring bandwidth to different classes of traffic, limiting the classes of traffic to corresponding maximum bandwidths, and dynamically allocating bandwidth to classes needing more than their maximum bandwidth when there exists available bandwidth.

2. Description of Related Art

Most commercial communication networks incorporate network switching devices, such as computer switches or routers, for example, to aggregate streams of data onto a network link and funnel the data traffic to its destination. These switching devices typically employ queuing methodologies to manage the flow of data streams onto the network link. For very high-speed network links, it is important that queuing methodologies be computationally simple so that the switch or router does not become a bottleneck. One such methodology is the Deficit Round Robin (DRR) technique (M. Shreedhar and G. Varghese, *Efficient Fair Queuing Using Deficit Round Robin*, Washington University, St. Louis, Mo. (Oct. 16, 1995)). DRR was designed to ensure that each class of traffic being transmitted out of a particular network device output port receives a user-selectable percentage of the port's bandwidth.

Figure 1:
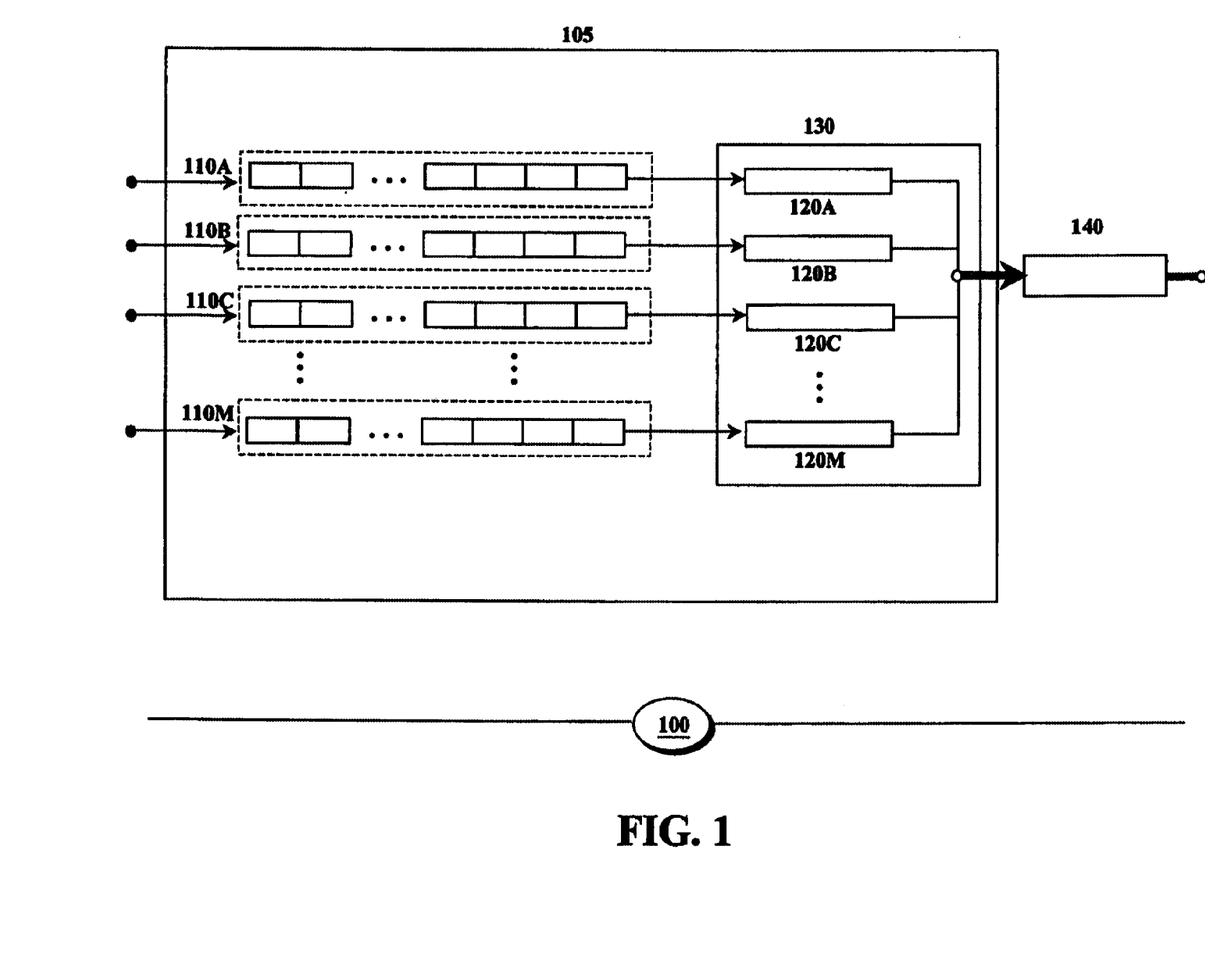
FIG. 1 (Prior Art) is a block diagram depicting a conventional queue servicing system.

FIG. 1 illustrates a representative system 100, employing DRR. As indicated in FIG. 1, a plurality of input streams of packetized data, representing different classes of traffic, flow into the output port 105 of a network switching device. These streams are captured by queues 110A–110M. As packets enter queues 110A–110M, their lengths are stored in a manner that enables the queue servicing algorithm to quickly obtain the length of the packet from the head packet of each queue. The user assigns each of the queues 110A–110M a "quantum" number of bytes, based on the class of traffic of each queue. The ratio of each of the queue's 110A–110M quantum to the total of all quanta represents the fraction of port bandwidth that each queue should receive. For example, queue 110A may represent a lower class of traffic and may be allocated a quantum of 500 bytes while queue 110B may represent a higher class and may be allocated a quantum of 1000 bytes. Queue 110C may represent an even higher class of traffic and may be allocated a quantum of 2000 bytes. If the total of all quanta is 10,000 bytes, then queue 110A should receive at least 500/10,000, or 5% of the output bandwidth. Likewise, queue 110B should receive 10% and 110C 20% of the bandwidth.

DRR incorporates "deficit counters" 120A–120M, which track how many bytes a queue may send. During an initialization stage, deficit counters 120A–120M are initialized to zero. During operation, DRR examines each of the queues 110A–110M in a round-robin fashion (i.e., returning to the first queue 110A after the final queue 110M has been observed). If there are no packets in the queue being examined, then that queue is skipped and the next queue is examined. If a queue, for example queue 110C, has at least one packet to send, then the quantum corresponding to queue 110C is added to its deficit counter 120C. DRR then compares the length of the head packet of queue 110C, with the number of bytes in deficit counter 120C. If the length is less than or equal to deficit counter 120C, the packet is dequeued and transmitted while deficit counter 120C is decremented by the byte length of the packet. DRR then examines queue 110C again to determined whether there exists another packet in queue 110C, whose length is less than the number of bytes contained in deficit counter 120C. If so, the packet is dequeued, transmitted, and deficit counter 120C decremented.

This process is repeated until there are either no packets in queue 110C or the length of the packet at the head of queue 110C is greater than the number of bytes contained in deficit counter 120C. If there are no packets in queue 110C, deficit counter 120C is set to zero and the next queue is examined.

It is to be noted, however, that there are situations in which one queue may need more than its allocated target bandwidth while other queues are dormant. There are other situations where it may be desirable to ensure a predetermined bandwidth to a queue while enabling it to operate at a higher bandwidth if there exists available bandwidth.

What is needed, therefore, is a method and system that ensures bandwidth to different classes of traffic, limits the classes of traffic to a maximum bandwidth, and enables pre-selected classes to use more than their maximum bandwidth when there is bandwidth available.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the present invention refers to the accompanying drawings that illustrate preferred embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the present invention as described below may be implemented in many different embodiments of software, firmware, and hardware in the entities illustrated in the figures. The actual software code or specialized control hardware used to implement the present invention is not limiting of the present invention. Thus, the operation and behavior of the present invention will be described without specific reference to the actual software code or specialized hardware components, it being understood that a person of ordinary skill in the art would be able to design software and/or control hardware to implement the embodiments of the present invention based on the description herein.

First Embodiment

Figure 2A:
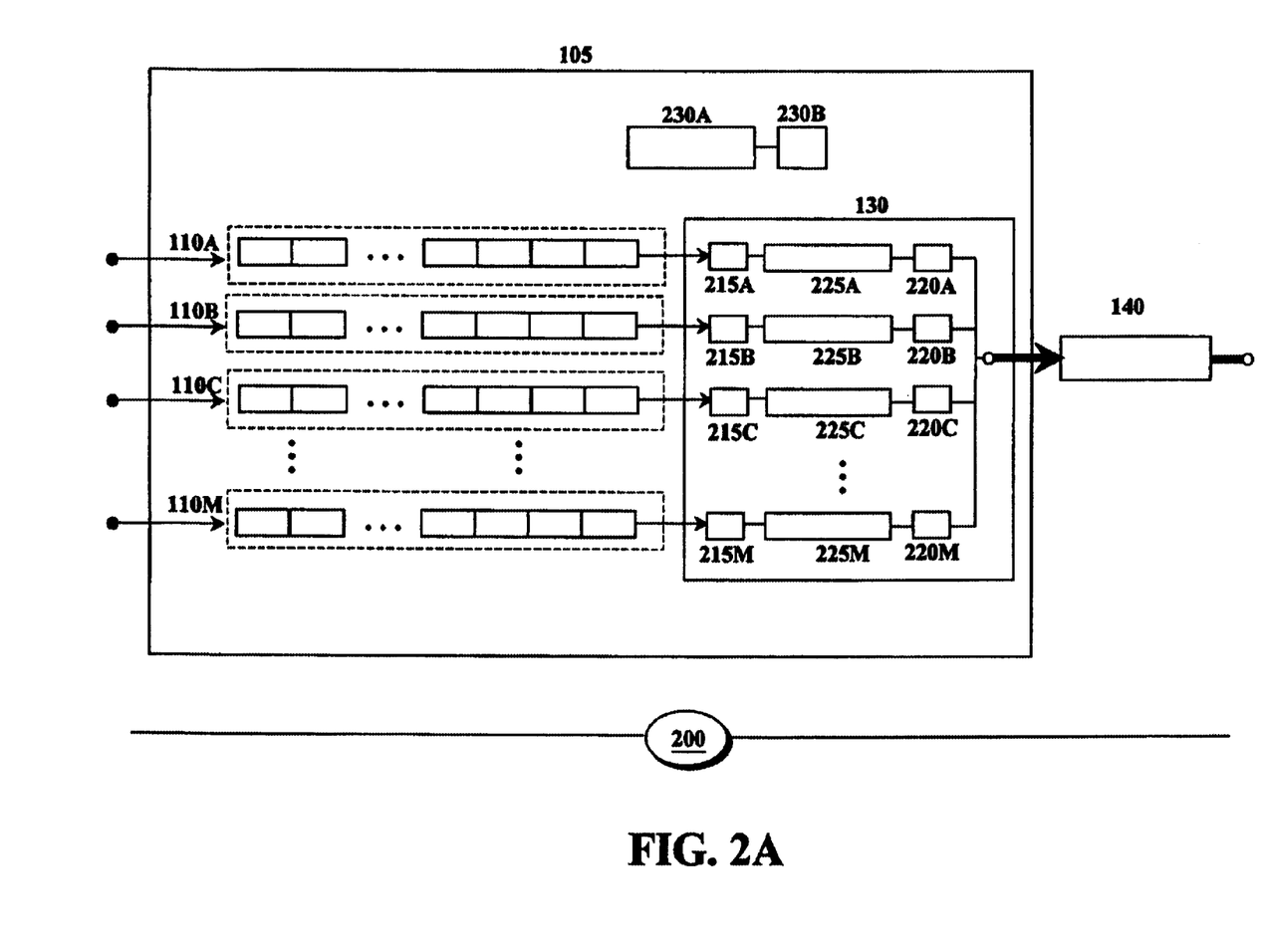
FIG. 2A is a block diagram depicting a queue servicing system in accordance with a first embodiment of the present invention.

FIGS. 2A and 2B–2E illustrate system 200 and process 250, respectively, which are constructed and operative in accordance with a first embodiment of the present invention. FIG. 2A is a functional block diagram depicting various components of queue servicing system 200. FIGS. 2B–2E are flow diagrams illustrating queue servicing process 250, which comprises initialization routine 250A, credit update routine 250B, and packet selection routine 250C.

As depicted in FIG. 2A, system 200 contains an output section 105 of a network switching device. It will be appreciated that a network switching device may include one or more input sections and one or more output sections. Output section 105 includes selection mechanism 130, which is configured to select the next packet to be transmitted to output channel 140 from queues 110A–110M. Selection mechanism 130 incorporates "credit counters" 225A–225M, which accumulate a predetermined number of bytes over specific intervals of time (i.e., round time). Because each queue 110A–110M is assigned a target bandwidth, selection mechanism 130 utilizes credit counters 225A–225M to determine, for each of the queues 110A–110M, how many bytes each queue may transmit without exceeding its target bandwidth.

As will be described in detail below, upon the initialization of system 200, selection mechanism 130 determines a "round time" for each of the queues 110A–110M. Round time is defined as the interval of time necessary to send a "quantum" number of bytes at the corresponding queue target bandwidths.

During the operation of system 200, selection mechanism 130 adds the quantum number of bytes to the corresponding credit counters 225A–225M during every round time. For example, suppose that quantum is specified as 100 bytes and queue 110A has a target bandwidth of 1 Mbps. To transmit 100 bytes (800 bits) at 1 Mbps would take a round time of (800/1,000,000) seconds or 800 microseconds. The effect is to credit bytes to queue 110A at its target bandwidth. As each packet from queue 110A is transmitted to output channel 140, credit counter 225A is decremented by the number of bytes in the packet. Thus, during operation, each of the credit counters 225A–225M keeps track of the number of bytes its corresponding queue may transmit without exceeding its target bandwidth.

Selection mechanism 130 also incorporates borrow enable flags (BEFs) 215A–215M and maximum credit registers 220A–220M for each of the queues 110A–110M. BEFs 215A–215M are initialized to the enabled state if the corresponding queue is allowed to transmit at greater a than its target bandwidth (i.e., by borrowing unused bandwidth). Otherwise, BEFs 215A–215M are initialized to the disabled state. Maximum credit registers 220A–220M are initialized to the maximum number of bytes that each of the queues 110A–110M is allowed to accumulate in its credit counter 225A–225M.

System 200 further comprises shared credit counter 230A. If any of the credit counters 225A–225M exceed the maximum number of bytes indicated by their respective maximum credit registers 220A–220M, then the bytes that would otherwise be added during round time to credit counters 225A–225M, are donated to shared credit counter 230A. Shared credit counter 230A stores these excess bytes so that if any of the queues 110A–110M need to transmit packets but lack the necessary bytes in their respective credit counter 225A–225M, the queues 110A–110M with enabled BEFs 215A–215M may borrow against the bytes stored in shared credit counter 230A. Shared credit counter 230A also has an associated maximum shared credit register 230B, containing a value representing the maximum amount of bytes that shared credit counter 230A may store. In this manner, the unused output channel 140 bandwidth is allocated to a centralized location (shared credit counter 230A) to allow queues 110A–110M to borrow against it. As such, all queues 110A–110M may contribute to shared credit counter 230A but only queues 110A–110M having enabled BEFs 215A–215M may borrow from shared credit counter 230A.

In addition, system 200 may modify the target bandwidth of queues 110A–110M. If the sum of the target bandwidth of all queues 110A–110M is less than the total output channel 140 bandwidth, then the unallocated bandwidth (i.e., the difference between total output channel 140 bandwidth and the sum of the target bandwidth of all queues 110A–110M) is distributed among the BEF-enabled queues in proportion to their original target bandwidth.

Figure 2B:
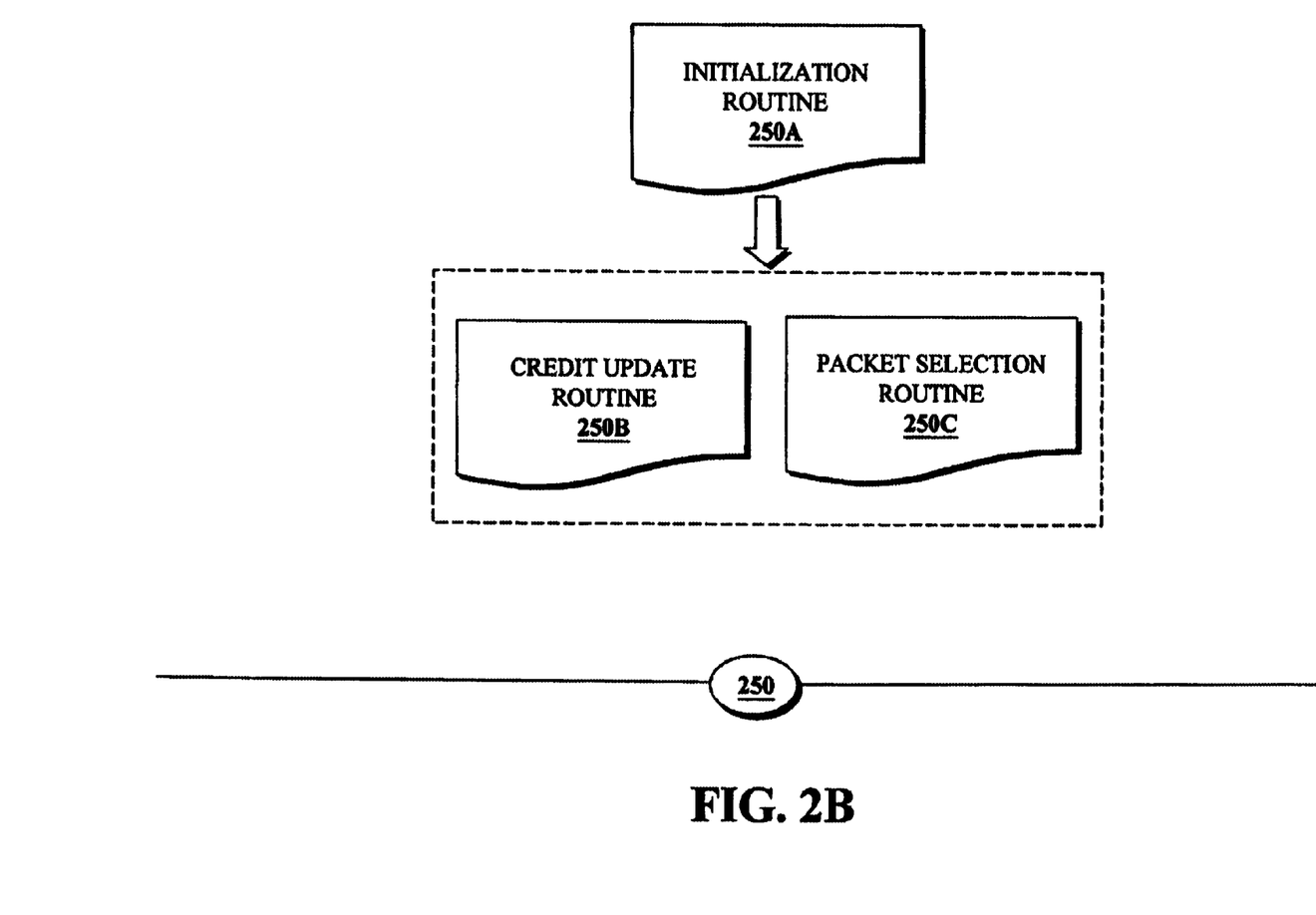
FIGS. 2B–2E are flow diagrams illustrating a queue servicing process in accordance with a first embodiment of the present invention.

FIG. 2B illustrates queue servicing process 250, which integrates the various routines comprising the first embodiment. Queue servicing process 250 includes initialization routine 250A, credit update routine 250B, and packet selection routine 250C. Process 250 may be stored in any storage device, such as, for example, a computer system (non-volatile) memory, an optical disk, magnetic tape, or magnetic disk. Furthermore, process 250 may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer or network device.

Figure 2C:
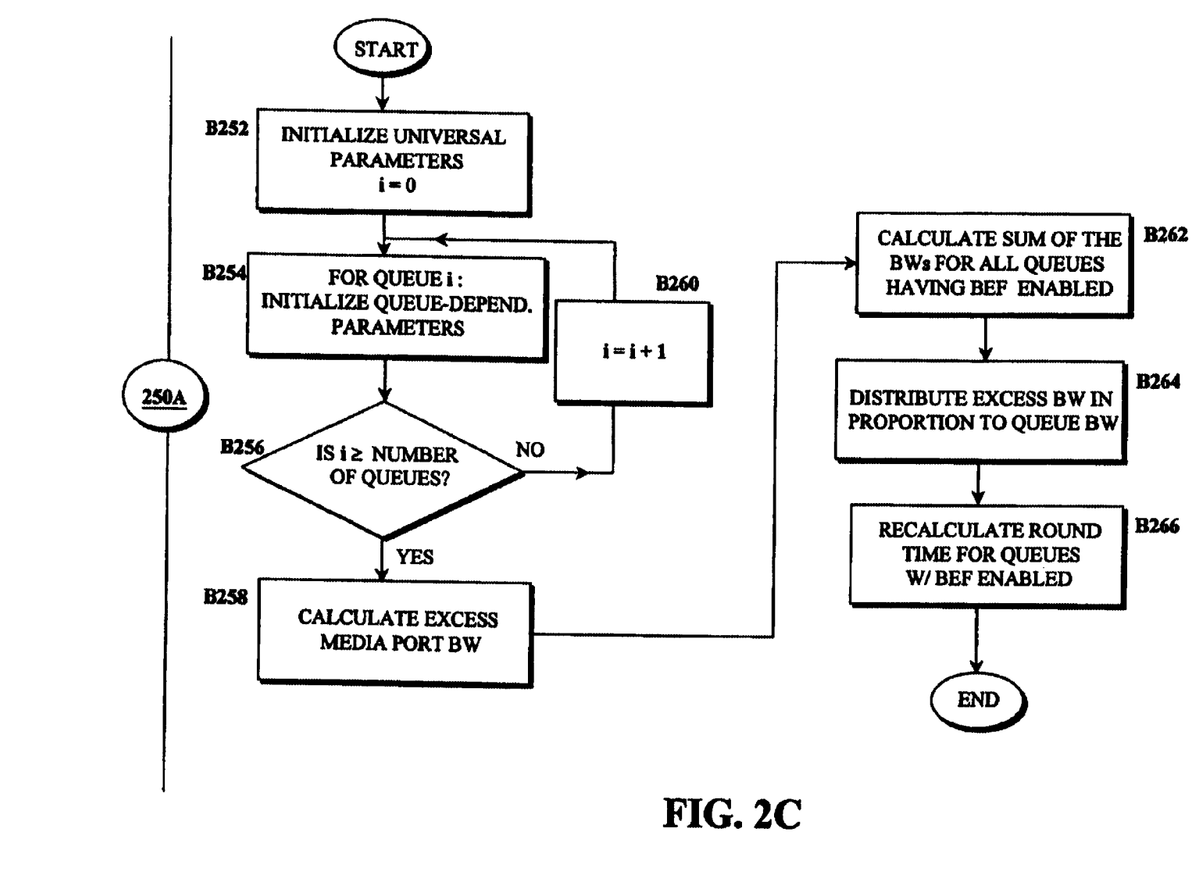

FIG. 2C depicts initialization routine 250A, which initializes universal parameters (i.e., queue independent parameters) and queue dependent parameters. As indicated in block B252, routine 250A initializes universal parameters, such as, for example, queue index i, output channel 140 bandwidth, quantum, and maximum shared credit register 230B value.

Upon initializing the universal parameters, routine 250A, in block B254, initializes queue dependent parameters for each queue, indicated by queue index i. As noted above, routine 250A calculates the round time for queue i. In addition, routine 250A stores the following queue dependent parameters supplied by the user: queue $110i$ target bandwidth, the value in maximum credit register $220i$ and BEF $215i$. Furthermore, credit counter $225i$ is set to quantum.

In block B256, routine 250A determines whether the queue dependent parameters for all classes have been initialized. If so, routine 250A progresses to block B258. If all the queues 110A–110M have not been initialized, then routine 250A, in block B260, increments queue index i and returns to block B254 to initialize the queue-dependent parameters for the next queue i+1.

After initializing the queue dependent parameters for all the queues, routine 250A distributes the unused output channel 140 bandwidth by proportionately adding the unused or excess bandwidth to each of the queues 110A–110M. Specifically, in block B258, routine 250A calculates the excess output channel 140 bandwidth (i.e., excess bandwidth=output channel bandwidth−sum of all queue target bandwidths). In block B262, routine 250A calculates the bandwidth sum of all the queues having enabled BEFs 215A–215M (i.e., total BEF enabled bandwidth=Σ BEF enabled queue bandwidths). In block B264, routine 250A distributes the excess bandwidth by adding a proportionate share of the excess bandwidth to the queue bandwidth (i.e., queue bandwidth i=queue bandwidth i+(excess bandwidth/total BEF enabled bandwidth)×queue bandwidth i). In block B266, routine 250A re-calculates the round time for each of the BEF-enabled queues.

Figure 2D:
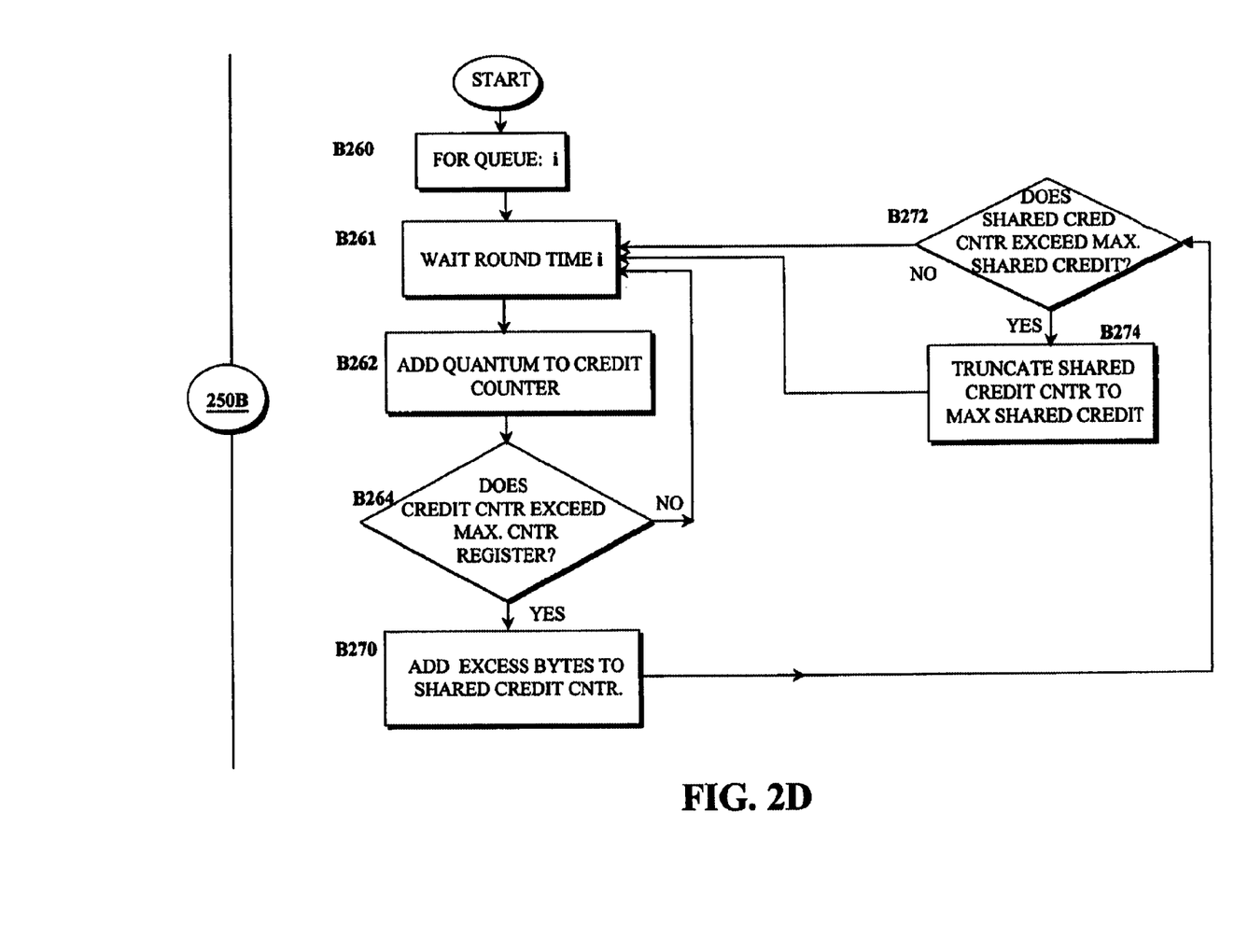

FIG. 2D depicts the update credit routine 250B, which increments credit counter 225*i* for each queue i. After initialization routine 250A has been completed, routine 250B is executed separately and continuously for each queue i.

As indicated in block B260, queue index i is initialized. In block B261, routine 250B waits for the passage of round time i. After waiting for round time i, routine 250B, in block B262, updates the corresponding credit counter 225*i* by adding the quantum number of bytes to counter 225*i*.

In block B264, routine 250B determines if credit counter 225*i* exceeds its maximum value contained in the corresponding maximum credit register 220*i*. If not, routine 250B returns to block B261, where it waits for the passage of round time i to commence another round of incrementing credit counter 225*i*. If routine 250B determines that credit counter 225*i* does exceed its maximum value in maximum credit register 220A–220M then, in block B270, routine 250B donates the excess bytes to shared credit counter 230A and advances to block B272.

In block B272, routine 250B determines whether share credit counter 230A exceeds its maximum value, as contained in maximum shared credit register 230B. If not, then routine 250B returns to block B261, where it waits for the passage of round time i to commence another round of incrementing credit counter 225*i*. If routine 250B determines that share credit counter 230A does exceed its maximum value, routine 250B truncates the value share credit counter 230A to the maximum value and returns to block B261 to repeat the process.

As such, each of the copies of routine 250B (i.e., one copy for each queue i) updates the credit counters 225A–225M by adding quantum bytes to the credit counters 225A–225M every round time and then checking to see whether credit counters 225A–225M exceed their maximum credit thresholds 220A–220M. If credit counters 225A–225M exceed their maximum credit threshold, then the excess bytes are donated to the shared credit counter 230A, so that any of the queues 110A–110M could use them. In addition, routine 250B checks to see whether donating the excess bytes causes the shared credit counter 230A to exceed its maximum. If it does, the number of bytes in shared credit 230A are truncated to its maximum value.

Figure 2E:
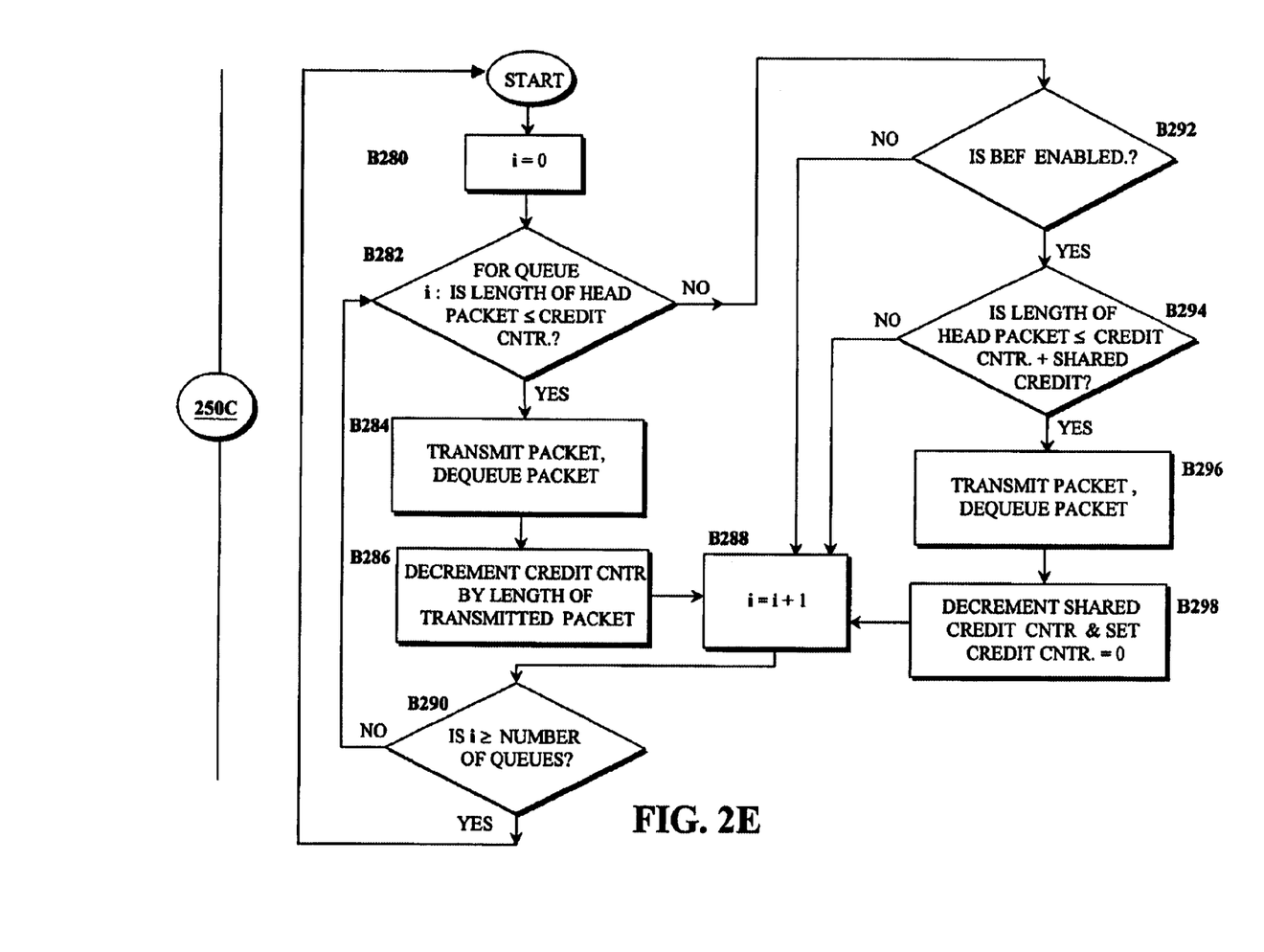

FIG. 2E illustrates packet selection routine 250C, which selects the packets to be transmitted for each queue i. After initialization routine 250A has been completed, one copy of routine 250C is executed continuously.

As indicated in block B280, queue index i is initialized. In block B282, process 250C determines, for queue i, whether the byte length of the packet at the head of queue i is less than or equal to the number of bytes in the corresponding credit counter 225*i*. If so, then in block B284, routine 250C transmits and dequeues the packet and, in block B286, routine 250C decrements the corresponding credit counter 225*i* by the byte length of the transmitted packet. In block B288, queue index i is incremented, and in block B290, routine 250C determines whether queue index i exceeds the number of queues. If it does, routine 250C returns to block B280 to repeat the process. If queue index i does not exceed the number of queues, routine 250C points to the next queue i+1.

Returning to block B282, if the byte length of the packet is not less than or equal to the number of bytes in the respective credit counter 225*i*, then routine 250C advances to block B292, where it determines whether the corresponding BEF 215*i* is enabled. If so, then routine 250C advances to block B294. If the corresponding BEF 215*i* is not enabled, routine 250C returns to blocks B288 and B290, to point to the next queue i+1.

After determining that BEF 215*i* is enabled, routine 250C determines, in block B294, whether the length of the packet is less than or equal to the sum of the bytes contained in the corresponding credit counter 225*i* and shared credit counter 230A. If not, then routine 250C returns to blocks B288 and B290, to point to the next queue i+1. If the length of the packet is less than or equal to the sum of the bytes contained in the corresponding credit counter 225*i* and shared credit counter 230A, then routine 250C progresses to block B296, where the packet is transmitted and dequeued. In block B298, the shared credit counter 230A is decremented by the difference between the byte length of the transmitted packet and the number of bytes stored in credit counter 225*i* and credit counter 225*i* is then set to 0. Routine 250C then returns to blocks B288 and B290 to point to the next queue i+1.

As such, routine 250C selects the queues 110A–110M that will transmit packets by examining the head packet lengths to determine if there are enough bytes in the corresponding credit counters 225A–225M to justify transmission. If there are enough bytes, a packet from queue i is transmitted and the credit counter 225*i* is decremented. If there are not enough bytes in credit counter 225*i*, the bytes required to justify transmission may be borrowed from shared credit counter 230, which is then is decremented accordingly. In this manner routine 250C, provides the option of limiting any queue to a single target bandwidth while allowing other queues to borrow unused bandwidth.

Second Embodiment

Figure 3A:
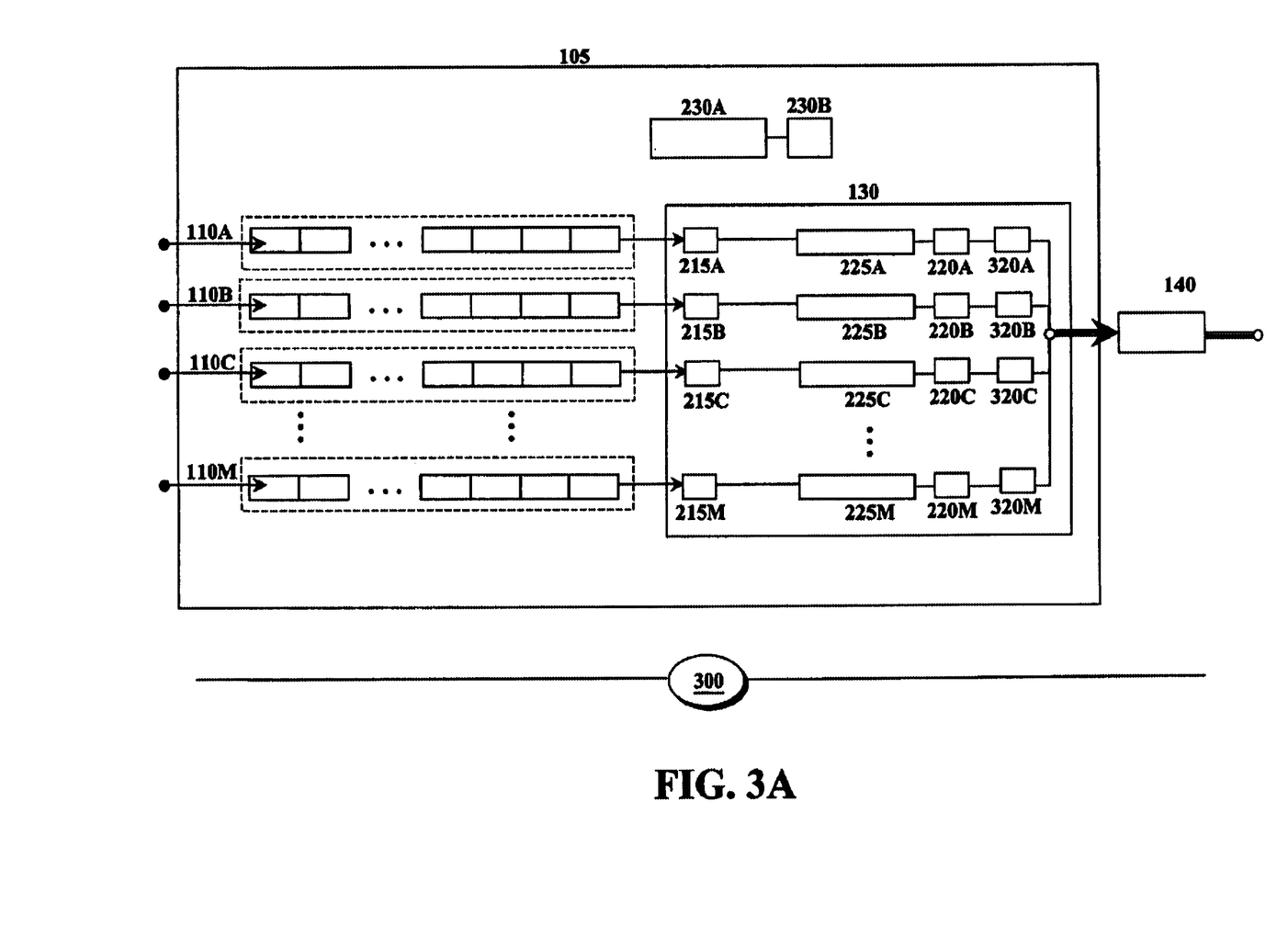
FIG. 3A is a block diagram depicting a queue servicing system in accordance with a second embodiment of the present invention.
Figure 3B:
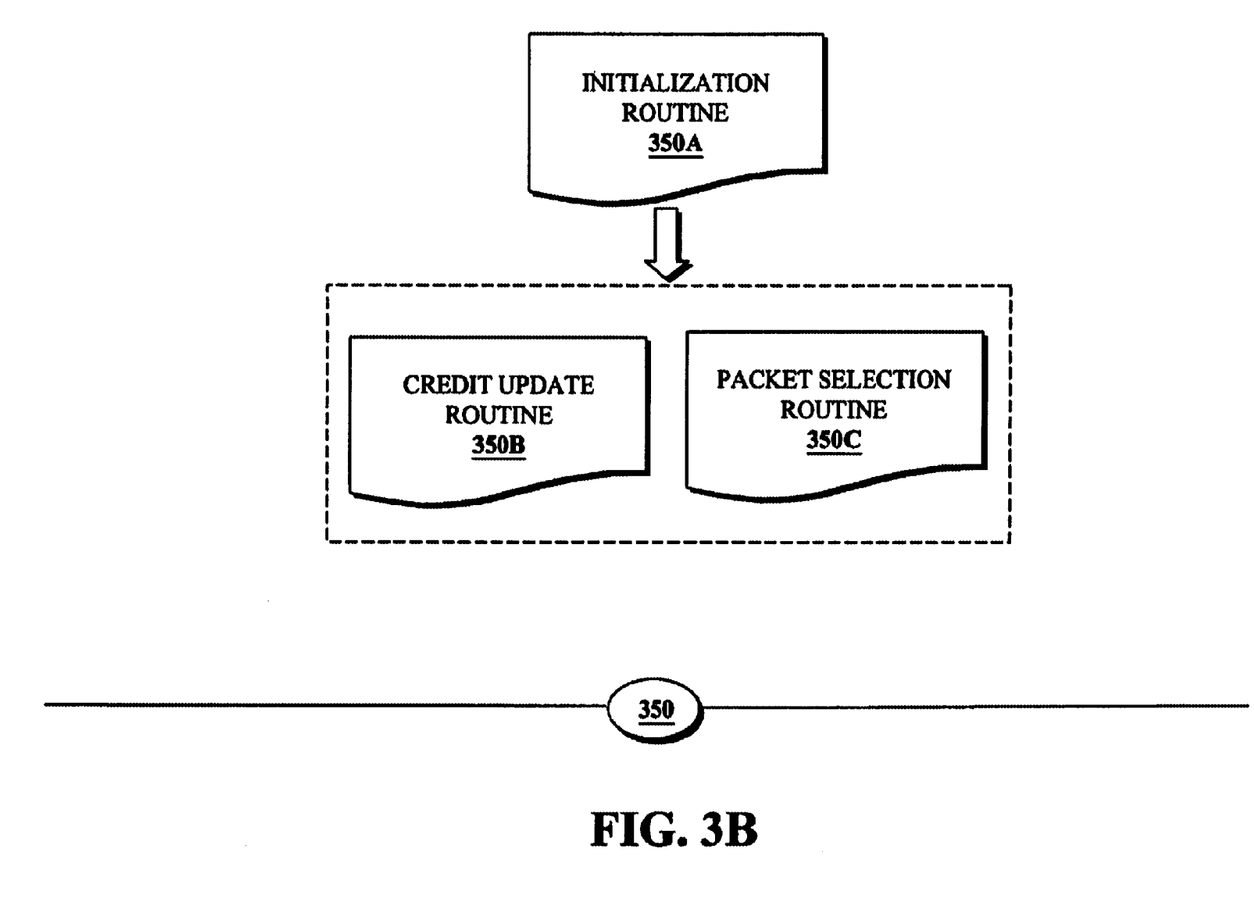
FIGS. 3B–3E are flow diagrams illustrating a queue servicing process in accordance with a second embodiment of the present invention.

FIGS. 3A and 3B illustrate system 300 and process 350, respectively, which are constructed and operative in accordance with a second embodiment of the present invention. FIG. 3A is a functional block diagram depicting various components of queue servicing system 300, including, inter alia, credit-up counters 320A–320M associated with each queue 110A–110M. FIG. 2B illustrates queue servicing process 350, which integrates the various routines comprising the second embodiment. Queue servicing process 350 includes initialization routine 350A, credit update routine 350B, and packet selection routine 350C. As stated above with respect to the first embodiment, process 350 may be stored in any storage device and may be programmed when the computer system is manufactured or via a computer-readable medium at a later date.

As depicted in FIG. 3A, selection mechanism 130 implements credit-up counters 320A–320M, which correspond to each of the queues 110A–110M. In addition to the queue target bandwidth, system 300 includes a queue upper bandwidth limit, which may never be exceeded. Associated with each queue upper bandwidth limit is a quantum-up value, which specifies the number of bytes that are added to credit-up counters 320A–320M at the rate of the queue upper bandwidths during round time. Quantum-up is the number of bytes, which may be transmitted during round time at the upper bandwidth rate. For example, if an upper bandwidth of a particular queue is 2 Mbps and its round time is 800 microseconds, quantum-up would be 200 bytes (i.e., 0.000800×2,000,000=1600 bits =200 bytes).

Figure 3C:
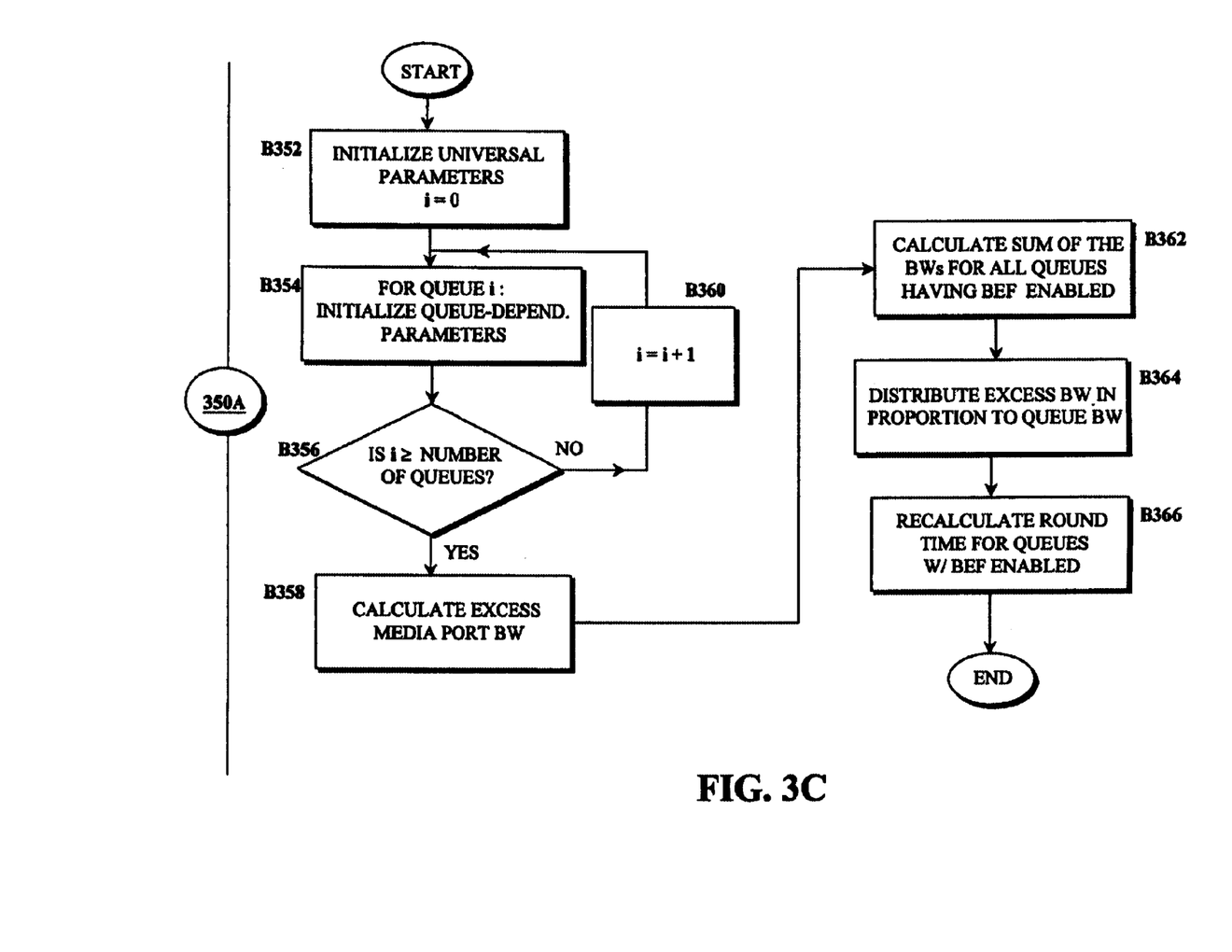

FIG. 3C depicts the first component of process 350, initialization routine 350A. Much like routine 250A of the first embodiment, routine 350A initializes the universal parameters and the queue dependent parameters. However, routine 350A takes into account the upper queue bandwidths and the credit-up counters 320A–320M.

As indicated in block B352, routine 350A initializes universal parameters, such as output channel 140 bandwidth, quantum, and maximum shared credit register 230B value, as well as queue index i.

Upon initializing the universal parameters, routine 350A, in block B354, initializes queue dependent parameters for each queue i. The queue dependent parameters supplied by the user include queue i bandwidth, BEF 215i, upper queue i bandwidths, and the maximum values in credit register 220i. Credit counter 225i and credit-up counter 320i are set to quantum. In addition, routine 350B calculates the round time for queue i and quantum-up.

In block B356, routine 350A determines whether the queue dependent parameters for all queues 110A–110M have been initialized. If so, routine 350A progresses to block B358. If all the queues 110A–110M have not been initialized, then routine 350, in block B360, increments queue index i and returns to block B354 to initialize the queue dependent parameters for the next queue i+1.

Similar to routine 250A of the first embodiment, routine 350A distributes the unused output channel 140 bandwidth by proportionately adding the unused or excess bandwidth to each of the queues 110A–110M, after initializing the queue dependent parameters for all the queues 110A–110M. For example, in block B358, routine 350A calculates the excess output channel 140 bandwidth (i.e., excess bandwidth= output channel bandwidth−sum of all queue target bandwidths). In block B362, routine 350A calculates the bandwidth sum of all the queues having enabled BEFs 215A–215M (i.e., total BEF enabled bandwidth=Σ BEF enabled queue bandwidths). In block B364, routine 350A distributes the excess bandwidth by adding a proportionate share of the excess bandwidth to the queue bandwidth (i.e., queue bandwidth i=queue bandwidth i+(excess bandwidth/ total BEF enabled bandwidth)×queue bandwidth i). In block B366, routine 350A recalculates the round time for each of the BEF-enabled queues.

Figure 3D:
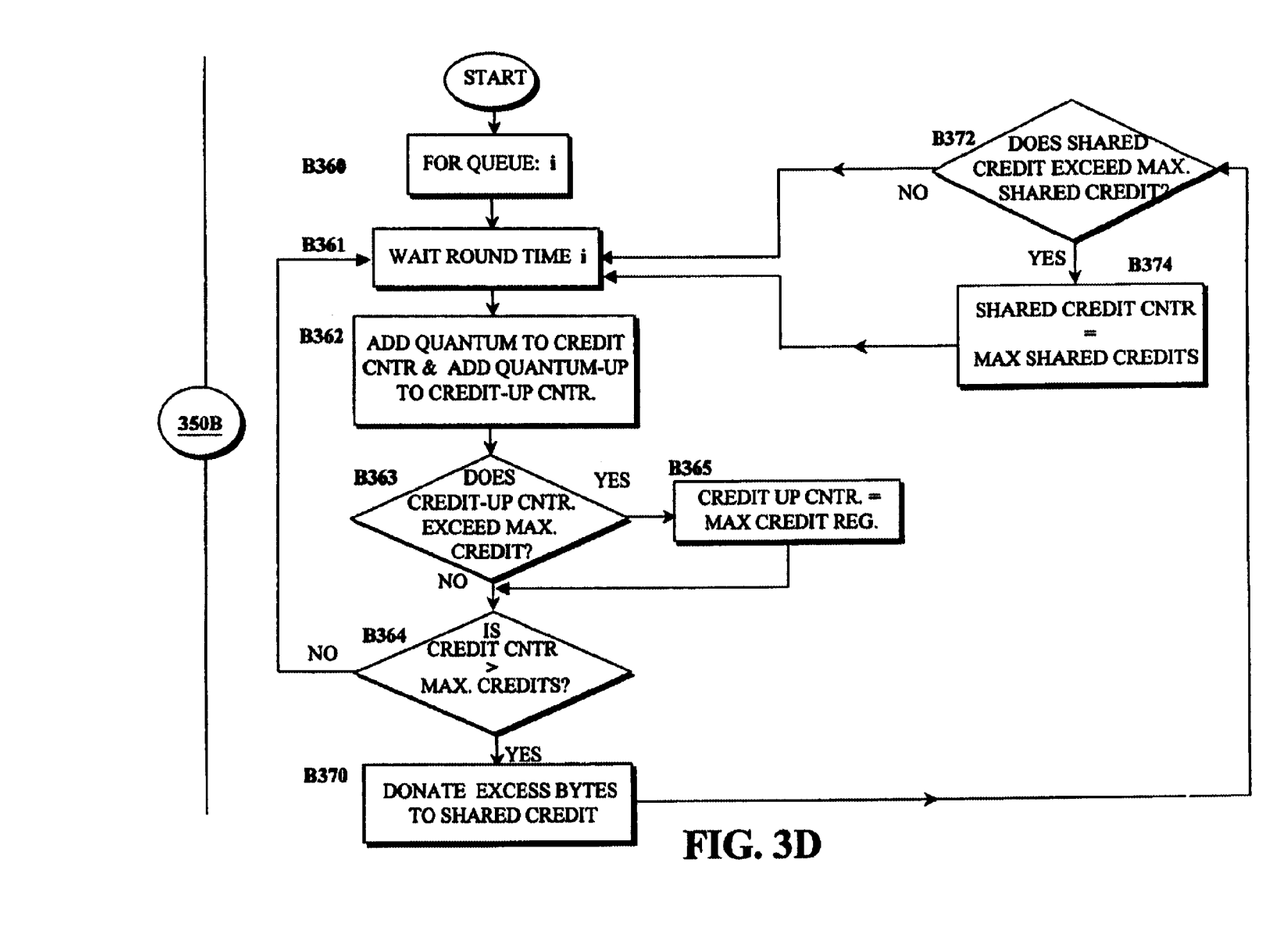

FIG. 3D depicts increment credit routine 350B, which updates the credit counters 225A–225M for each queue i. After initialization routine 250A has been completed, routine 350B is executed separately and continuously for each queue i.

As indicated in block B360, queue index i is initialized. In block B361, process 350B waits for the passage of round time i. In block B362, process 350B adds the quantum number of bytes to credit counter 225i and adds the quantum-up number of bytes to credit-up counter 320i. In block B363, routine 350B determines whether the credit-up counter 320i exceeds the maximum value contained in the corresponding maximum credit register 220i. If not, routine 350B advances to block B364. If credit-up counter 320i does exceed the maximum value in maximum credit register 220i, routine 350B advances to block B365 where credit-up counter 320i is set to the value contained in maximum credit register 220i.

In block B364, routine 350B determines whether credit counter 225i exceeds the value contained in the corresponding maximum credit register 220i. If not, routine 350B returns to block B361, where it waits for the passage of round time i to commence another round of incrementing credit counter 225i. If routine 250B determines that credit counter 225i does exceed the maximum value in maximum credit register 220A–220M then, in block B270, routine 250B donates the excess bytes to shared credit counter 230A and advances to block B372.

In block B372, routine 350B determines whether shared credit counter 230A exceeds the value in maximum shared credit register 230B. If not, then routine 350B returns to block B361 wait for another round time. If routine 350B determines that shared credit counter 230A does exceed the value in maximum shared credit register 230B, routine 350B truncates the value to the maximum shared credit value and returns to block B361 to wait another round time.

As such, routine 350B updates credit-up counters 320A–320M by adding quantum-up bytes every round time and never allowing them to exceed the value in the corresponding maximum credit registers 220A–220M. In addition, much like routine 250B of the first embodiment, routine 350B updates the credit counters 225A–225M by adding quantum bytes to the credit counters 225A–225M every round time and checking to see whether the added bytes exceed the value in the corresponding maximum credit registers 220A–220M. If the added bytes do exceed the maximum credit threshold, then the excess bytes are donated to the shared credit counter 230A, so that any of the BEF enabled queues 110A–110M can use them. Moreover, routine 350B checks to see whether donating the excess bytes causes the shared credit counter 230A to exceed its maximum. If it does, the number of bytes in shared credit 230A is truncated to its maximum value, as included in maximum shared credit register 230B.

Figure 3E:
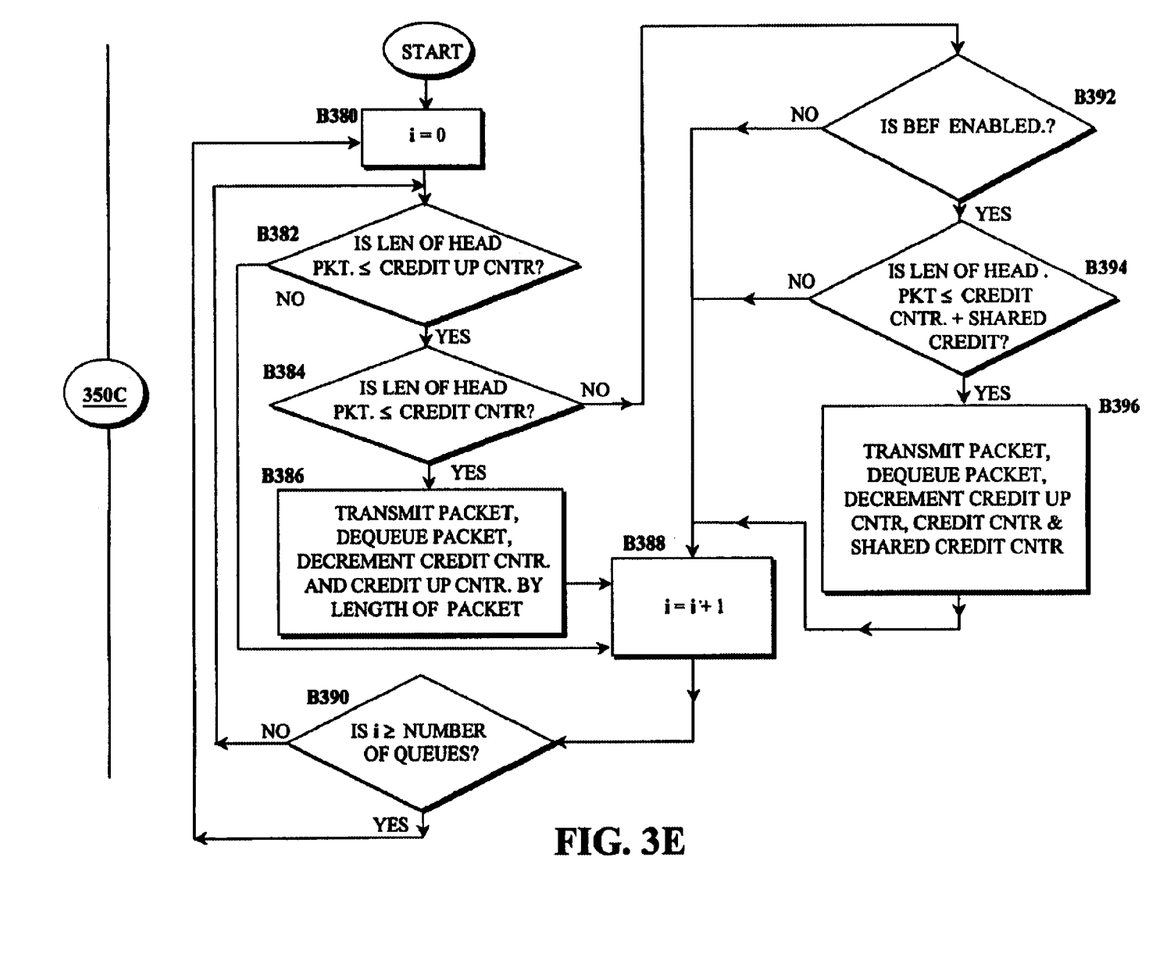

FIG. 3E illustrates packet selection routine 350C, which selects packets to be transmitted on channel 140. After initialization routine 350A has been completed, a single copy of routine 350B is executed continuously to serve all queues i.

As indicated in block B380, queue index i is initialized to 0. In block B382, routine 350C determines, whether the byte length of the head packet in queue i is less than or equal to the corresponding credit-up counter 320i. If not, then no packet may be sent and, routine 350C proceeds to block B388 to advance to the next queue i+1. If the byte length of the head packet in queue i is less than or equal to the corresponding credit-up counter 320i, then in block B384, routine 350C checks whether the byte length of the head packet less than or equal to the corresponding credit counter 225i. If so, routine 350C proceeds to block B386 where the packet is transmitted and dequeued and credit counter 225i and credit-up counter 320i are each decremented by the length of the packet.

Routine 350C then enters into block B388, to proceed to the next queue i+1 to be selected. In block B388 the queue index i is incremented and, in block B390, routine 350C determines whether queue index i is greater than or equal to the number of queues. If so, process 350C proceeds to block B380 where queue index i starts again at 0. If queue index i is not greater than or equal to the number of queues, process 350C proceeds to block B382 to operate on the next queue i+1 to be selected.

Returning to block B384, if the byte length of the packet is not less than or equal to the number of bytes in the corresponding credit counter B225$i$, then routine 350C advances to block B392, where it determines whether the corresponding BEF 215$i$ is enabled. If so, then routine 350C advances to block B394. If the corresponding BEF 215$i$ is not enabled, routine 350C returns to blocks B388 and B390, to point to the next queue i+1 to be selected.

After determining that the corresponding BEF 215$i$ is enabled, routine 350C, in block B394, determines if the length of the packet is less than or equal to the sum of the bytes contained in the corresponding credit counter 225$i$ and shared credit counter 230A. If not, then routine 350C returns to blocks B388 and B390, to point to the next queue i+1 to be selected. If the length of the packet is less than or equal to the sum of the bytes contained in the corresponding credit counter 225$i$ and shared credit counter 230A, then routine 350C progresses to block B396.

In block B396, the packet is transmitted and dequeued. Then credit-up counter 320$i$ is decremented by the packet length, shared credit counter 230A is decremented by packet length minus the value of credit counter 225$i$, and credit counter 225$i$ is decremented to zero. Finally, routine 396C proceeds to blocks B388 and B390 to point to the next queue i+1 to be selected.

In this manner, routine 350C selects packets from queues 110A–110M to be transmitted by examining the packet length to determine if there are enough bytes in the credit counters 225A–225M and credit-up counters 320A–320M to transmit the packets included therein. If there are enough bytes, the packets in the queues 110A–110M are transmitted and the credit counters 225A–225M are decremented. Credits may only be borrowed from shared credit counter 230A if BEF is enabled and there are enough bytes in credit up counters 320A–320M. Each queue is guaranteed to be able to transmit packets at least its target bandwidth rate, because its credit counter B225$i$ is receiving bytes at that rate. If BEF is enabled, a queue may borrow unused bandwidth up to the upper bandwidth limit. A queue may not exceed its upper bandwidth limit because its credit-up counter, which is incremented at the upper bandwidth rate, is not allowed to borrow.

The foregoing description of the preferred embodiments provides an illustration and description, but is not intended to be exhaustive or to limit the invention to the precise form disclosed. Modifications and variations are possible consistent with the above teachings or may be acquired from practice of the invention. Thus, it is noted that the scope of the invention is defined by the claims and their equivalents.

What is claimed:

1. A queue servicing method comprising:
   initializing parameters for a plurality of queues containing packetized data, said parameters including, for each of said queues, a quantum value, a borrow enable flag, and a first counter maximum value;
   incrementing a first counter for each of said queues with said quantum value;
   donating said quantum value to a share counter when a value of said first counter exceeds said first counter maximum value; and
   selecting a packet from each of said queues to be dequeued and transmitted on an output channel,
   wherein said packet is dequeued and transmitted when a byte length of said packet is less than or equal to the value contained in said first counter or when the borrow enable flag is enabled and the byte length of said packet is less than or equal to a sum of the values contained in said first counter and said share counter,
   wherein said parameters further include,
     a share counter maximum value,
     an output channel bandwidth,
     a queue bandwidth for each of said queues, and
     a round time for each of said queues, said round time providing an interval of time to increment said first counter for each of said queues, wherein said round time is based on said quantum value and said queue bandwidth,
   wherein for each of said queues a borrow enable flag is enabled when a corresponding queue is allowed to borrow from said share counter in order to dequeue and transmit packets,
   wherein said initializing further includes,
     calculating excess output channel bandwidth,
     distributing said excess output channel bandwidth proportionately to each of said queues, and
     recalculating said round time for each of said queues having borrow enable flags that are enabled, and
   wherein said selecting further includes,
     determining whether the value contained in said share counter exceeds said share counter maximum value, and
     setting the value contained in said share counter to said share counter maximum value when the value contained in said share counter exceeds said share counter maximum value.

2. The method of claim 1, wherein said selecting further includes,
   decrementing the value contained in said first counter by the byte length of said transmitted packet, when the byte length of said packet is less than or equal to the value contained in said first counter.

3. The method of claim 2, wherein said selecting further includes,
   setting the value contained in said first counter to zero, when said borrow enable flag is enabled and the byte length of said packet is less than or equal to a sum of the values contained in said first counter and said share counter, and
   decrementing the value contained in said share counter by the difference between the byte length of said transmitted packet and the value contained in said first counter.

4. The method of claim 3, wherein said parameters further include.
   an upper queue bandwidth for each of said queues.
   a second counter for each of said queues, and
   a quantum-up value providing a number of bytes that are added to said second counter at said upper queue bandwidth for each of said queues during said round time.

5. The method of claim 4, wherein said selecting further includes,
   dequeuing and transmitting said packet when the byte length of said packet is less than or equal to the value contained in said first counter and said second counter, and
   decrementing the value contained in said first counter and said second counter by the byte length of said transmitted packet.

6. The method of claim 5, wherein said selecting further includes,
   dequeuing and transmitting said packet when the borrow enable flag is enabled and the byte length of said packet is less than or equal to the sum of the values contained in said first counter and said share counter, and decrementing the value contained in said first counter said second counter and said share counter by the byte length of said transmitted packet.

7. A computer-readable medium encoded with a plurality of processor-executable instruction sequences for:

initializing parameters for a plurality of queues containing packetized data, said parameters including, for each of said queues, a quantum value, a borrow enable flag, and a first counter maximum value;

incrementing a first counter for each of said queues with said quantum value;

donating said quantum value to a share counter when a value of said first counter exceeds said first counter maximum value; and selecting a packet from each of said queues to be dequeued and transmitted on an output channel, wherein said packet is dequeued and transmitted when a byte length of said packet is less than or equal to the value contained in said first counter or when the borrow enable flag is enabled and the byte length of said packet is less than or equal to a sum of the values contained in said first counter and said share counter, wherein said parameters further include,
a share counter maximum value,
an output channel bandwidth,
a queue bandwidth for each of said queues, and
a round time for each of said queues, said round time providing an interval of time to increment said first counter for each of said queues, wherein said round time is based on said quantum value and said queue bandwidth, wherein for each of said queues a borrow enable flag is enabled when a corresponding queue is allowed to borrow from said share counter in order to dequeue and transmit packets, wherein said initializng further includes,
calculating excess output channel bandwidth, and
distributing said excess output channel bandwidth proportionately to each of said queues, and
recalculating said round time for each of said queues having borrow enable flags that are enabled, and wherein said selecting further includes,
determining whether the value contained in said share counter exceeds said share counter maximum value, and
setting the value contained in said share counter to said share counter maximum value when the value contained in said share counter exceeds said share counter maximum value.

8. The computer-readable medium of claim 7, wherein said selecting further includes, decrementing the value contained in said first counter by the byte length of said transmitted packet, when the byte length of said packet is less than or equal to the value contained in said first counter.

9. The computer-readable medium of claim 8, wherein said selecting further includes, setting the value contained in said first counter to zero, when said borrow enable flag is enabled and the byte length of said packet is less than or equal to a sum of the values contained in said first counter and said share counter, and decrementing the value contained in said share counter by the difference between the byte length of said transmitted packet and the value contained in said first counter.

10. The computer-readable medium of claim 9, wherein said parameters further include, an upper queue bandwidth for each of said queues,
a second counter for each of said queues, and
a quantum-up value providing a number of bytes that are added to said second counter at said upper queue bandwidth for each of said queues during said round time.

11. The computer-readable medium of claim 10, wherein said selecting further includes, dequeuing and transmitting said packet when the byte length of said packet is less than or equal to the value contained in said first counter and said second counter, and decrementing the value contained in said first counter and said second counter by the byte length of said transmitted packet.

12. The computer-readable medium of claim 11, wherein said selecting further includes, dequeuing and transmitting said packet when the borrow enable flag is enabled and the byte length of said packet is less than or equal to the sum of the values contained in said first counter and said share counter, and decrementing the value contained in said first counter, said second counter, and said share counter by the byte length of said transmitted packet.

13. A queue servicing system comprising:

a plurality of queues containing packetized data;

a selection mechanism, coupled to each of said queues, configured to select a packet from each of said queues to dequeue and transmit to an output channel, said selection mechanism including a first counter, a borrow enable flag, and a first counter maximum value register for each of said queues, said first counter being incremented with a quantum value;

a share counter to receive said quantum value when said first counter exceeds a value contained in said first counter maximum value register, wherein said packet is dequeued and transmitted when a byte length of said packet is less than or equal to the value contained in said first counter or when the borrow enable flag is enabled and the byte length of said packet is less than or equal to a sum of the values contained in said first counter and said share counter;

a share counter maximum value;

an output channel bandwidth;

a queue bandwidth for each of said queues; and a round time for each of said queues, said round time providing an interval of time to increment said first counter for each of said queues, wherein said round time is based on said quantum value and said queue bandwidth, wherein for each of said queues a borrow enable flag is enabled when a corresponding queue is allowed to borrow from said share counter in order to dequeue and transmit packets, wherein excess output channel bandwidth is calculated, said excess output channel bandwidth is distributed proportionately to each of said queues, and said round time is recalculated for each of said queues having borrow enable flags that are enabled, and wherein said selection mechanism is adapted to
determine whether the value contained in said share counter exceeds said share counter maximum value, and set the value contained in said share counter to said share counter maximum value when the value contained in said share counter exceeds said share counter maximum value.

14. The system of claim 13, wherein said selection mechanism further decrements the value contained in said first counter by the byte length of said transmitted packet, when the byte length of said packet is less than or equal to the value contained in said first counter.

15. The system of claim 14, wherein said selection mechanism further sets the value contained in said first counter to zero, when said borrow enable flag is enabled and the byte length of said packet is less than or equal to a sum of the values contained in said first counter and said share counter, and decrements the value contained in said share counter by the difference between the byte length of said transmitted packet and the value contained in said first counter.

16. The system of claim 15, further including, an upper queue bandwidth for each of said queues, a second counter for each of said queues, and a quantum-up value providing a number of bytes that are added to said second counter at said upper queue bandwidth for each of said queues during said round time.

17. The system of claim 16, wherein said packet is dequeued and transmitted when the byte length of said packet is less than or equal to the value contained in said first counter and said second counter, and the value contained in said first counter and said second counter is decremented by the byte length of said transmitted packet.

18. The system of claim 17, wherein said packet is dequeued and transmitted when the borrow enable flag is enabled and the byte length of said packet is less than or equal to the sum of the values contained in said first counter and said share counter, and the value contained in said first counter, said second counter, and said share counter is decremented by the byte length of said transmitted packet.

19. A queue servicing method comprising:

tracking unused bandwidth for each of a plurality of queues containing packetized data;

enabling select ones of said queues to borrow bandwidth from an output channel;

allocating said unused bandwidth to a shared location when said tracked unused bandwidth exceeds a predetermined threshold;

allowing one or more of said borrow-enabled queues to borrow against said allocated unused bandwidth in said shared location in order to dequeue and transmit a packet to said output channel when a byte length of said packet is greater than its corresponding tracked unused bandwidth;

allowing one or more of said queues to dequeue and transmit a packet to said output channel when a byte length of said packet is less than or equal to its corresponding tracked unused bandwidth, wherein said tracking includes employing a round time for each of said queues that provides an interval of time to accumulate said unused bandwidth corresponding to each of said queues;

calculating excess output channel bandwidth;

distributing said excess output channel bandwidth proportionately to each of said queues to enhance throughput; and recalculating said round time for each of said borrow-enabled queues, wherein said allowing one or more of said queues to dequeue and transmit a packet further includes, setting the tracked unused bandwidth to zero, when the byte length of said transmitted packet is greater than its corresponding tracked unused bandwidth, and decrementing the allocated unused bandwidth in said shared location by the difference between the byte length of said transmitted packet and said tracked unused bandwidth.

20. The method of claim 19, wherein said allowing one or more of said queues to dequeue and transmit a packet further includes, decrementing said tracked unused bandwidth by the byte length of said transmitted packet, when the byte length of said packet is less than or equal to said tracked unused bandwidth.

21. The method of claim 20, further including, setting an unexceedable upper bandwidth for each of said queues, adjusting said round time for each of said queues to provide an interval of time to accumulate said unused bandwidth corresponding to each of said queues at said upper bandwidth, and tracking said unused upper bandwidth for each of said queues.

22. The method of claim 21, wherein said allowing one or more of said queues to dequeue and transmit a packet further includes, transmitting said packet when the byte length of said packet is less than or equal to the sum of its corresponding tracked unused bandwidth and said allocated unused bandwidth in said shared location, and decrementing said tracked unused bandwidth, said tracked unused upper bandwidth, and said allocated unused bandwidth by the byte length of said transmitted packet.

23. The method of claim 22, wherein said allowing one or more of said queues to dequeue and transmit a packet further includes, transmitting said packet when the byte length of said packet is less than or equal to its corresponding tracked unused bandwidth and tracked unused upper bandwidth, and decrementing said tracked unused bandwidth and said tracked unused upper bandwidth by the byte length of said transmitted packet.

24. A queue servicing system comprising:

a plurality of queues containing packetized data; and a selection mechanism, coupled to each of said queues, configured to select a packet from each of said queues to dequeue and transmit to an output channel, to enable select ones of said queues to borrow bandwidth from said output channel, to track unused bandwidth for each of said queues, and to allocate said unused bandwidth to a shared location when said tracked unused bandwidth exceeds a predetermined threshold, wherein said selection mechanism allows one or more of said borrow-enabled queues to borrow against said allocated unused bandwidth in said shared location in order to dequeue and transmit a packet to said output channel when a byte length of said packet is greater than its corresponding tracked unused bandwidth, wherein said selection mechanism further allows one or more of said queues to dequeue and transmit a packet to said output channel when a byte length of said packet is less than or equal to its corresponding tracked unused bandwidth, calculates a round time for each of said queues to provide an interval of time to accumulate said unused bandwidth corresponding to each of said queues, calculates excess output channel bandwidth, distributes said excess output channel bandwidth proportionately to each of said queues to enhance throughput, recalculates said round time for each of said borrow-enabled queues sets the tracked unused bandwidth to zero, when the byte length of said transmitted packet is greater than its corresponding tracked unused bandwidth, and decrements the allocated unused bandwidth in said shared location by the difference between the byte length of said transmitted packet and said tracked unused bandwidth.

25. The system of claim 24, wherein said selection mechanism further decrements said tracked unused bandwidth by the byte length of said transmitted packet, when the byte length of said packet is less than or equal to said tracked unused bandwidth.

26. The system of claim 25, wherein said selection mechanism further sets an unexceedable upper bandwidth for each of said queues, adjusts said round time for each of said queues to provide an interval of time to accumulate said unused bandwidth corresponding to each of said queues at said upper bandwidth, and tracks said unused upper bandwidth for each of said queues.

27. The system of claim 26, wherein said selection mechanism further transmits said packet when the byte length of said packet is less than or equal to the sum of its corresponding tracked unused bandwidth and said allocated unused bandwidth in said shared location, and decrements said tracked unused bandwidth, said tracked unused upper bandwidth, and said allocated unused bandwidth by the byte length of said transmitted packet.

28. The system of claim 27, wherein said selection mechanism further transmits said packet when the byte length of said packet is less than or equal to its corresponding tracked unused bandwidth and tracked unused upper bandwidth, and decrements said tracked unused bandwidth and said tracked unused upper bandwidth by the byte length of said transmitted packet.

* * * * *